Patented Jan. 12, 1954

2,666,058

UNITED STATES PATENT OFFICE 2,666,058

UNDECYLENIC ACID ESTERS OF 8-HYDROXYQUINOLINES

Robert Neher, Basel, Switzerland, assignor to Ciba Pharmaceutical Products, Inc., Summit, N. J.

No Drawing. Application May 14, 1951, Serial No. 226,271

Claims priority, application Switzerland May 16, 1950

6 Claims. (Cl. 260—286)

The present invention relates to undecylenic acid esters of 8-hydroxyquinolines and the salts of these esters.

These new esters—and more especially those of 8-hydroxyquinoline and halogen-8-hydroxyquinolines such as that 8-hydroxyquinoline ester which corresponds to the formula

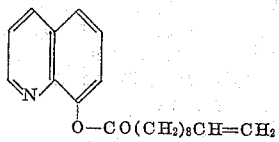

and the 5-chloro-7-iodo-8-hydroxyquinoline ester which corresponds to the formula

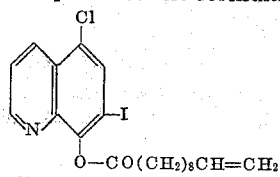

and their salts, are effective against micro-organisms such as fungi, bacteria and protozoa and can be used, for example as medicaments against skin diseases caused by fungi, and principally such diseases of the feet. As compared with undecylenic acid or 8-hydroxyquinolines and their known esters, the new compounds are distinguished by their more advantageous effect, for example, with regard to their fungicidal action with respect to thrush and trichophyton. Especially noteworthy is their good activity against amoeba.

The new esters can be readily prepared. Thus, undecylenic acid or a reactive derivative thereof, such as a halide or the anhydride, may be reacted with an 8-hydroxyquinoline or a phenolate thereof. This reaction is advantageously carried out in the presence of a condensing agent, and especially one of basic character such as pyridine.

Depending on the method used, the new compounds are obtained in the form of their bases or their salts. From the free bases there can be obtained in the usual manner, for example, with the aid of hydrohalic acid, sulfuric acid, nitric acid, phosphoric acid, thiocyanic acid, acetic acid, propionic acid, oxalic acid, methane sulfonic acid, ethane sulfonic acid, hydroxyethane sulfonic acid, benzene sulfonic acid or toluene sulfonic acid, etc., the corresponding salts, namely, the hydrohalide, sulfate, nitrate, phosphate, thiocyanate, acetate, propionate, oxalate, methane sulfonate, ethane sulfonate, hydroxyethane sulfonate, benzene sulfonate or toluene sulfonate, etc.

The following examples illustrate the invention, the parts being by weight unless otherwise stated and the relationship between parts by weight and parts by volume being the same as that of the gram to the cubic centimeter. Temperatures are given in degrees centigrade.

Example 1

A solution of 28 parts of undecylenic acid chloride in a small quantity of dry ether is added to a solution of 20 parts of 8-hydroxyquinoline in 100 parts by volume of dry ether and 11.5 parts by volume of pyridine, and the whole is allowed to stand for a few hours. The reaction mixture is then thoroughly treated with water, then with dilute caustic soda solution, and again with water, and the ethereal solution is dried, the ether is removed, and the residue is distilled under a high vacuum. There is obtained the undecylenic acid ester of 8-hydroxyquinoline of the formula

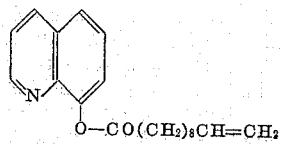

in the form of a colorless oil and in a yield of about 80 per cent. It boils at 174–180° under 0.05 mm. pressure. From ethereal solution it can be precipitated, by the addition of dilute hydrochloric acid, in the form of its hydrochloride which is a colorless precipitate melting at 102–104°.

The compound obtained according to this example, when used for therapeutic purposes, may be worked up for example into a preparation containing 10 parts of undecylenic acid ester of 8-hydroxyquinoline, 10 parts of adeps lanae, 65 parts of white Vaseline and 15 parts of Vaseline oil.

Example 2

20 parts of 5-chloro-8-hydroxyquinoline are dissolved in 60 parts by volume of pyridine, and then mixed with a solution of 23 parts of undecylenic acid chloride in 100 parts by volume of benzene. The whole is allowed to stand for a few hours. Upon working the mixture up in the manner described in Example 1, the undecylenic acid ester of 5-chloro-8-hydroxyquinoline having the formula

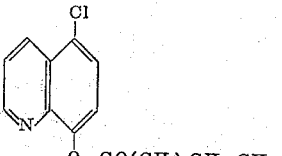

distils under 0.3 mm. pressure at 190–200°. It melts at 41–42°. The yield amounts to 94 per cent. of the theoretical yield.

Example 3

9 parts of 5,7-dichloro-8-hydroxyquinoline are dissolved in 100 parts by volume of benzene and 3.5 parts by volume of pyridine, the whole is mixed with 8.6 parts of undecylenic acid chloride, and allowed to stand for several hours. The reaction mixture is treated with water, with dilute caustic soda solution, with dilute hydrochloric acid and again with water. The solution is dried, and, after removing the benzene, the residue is distilled in vacuo. The undecylenic acid ester of 5,7-dichloro-8-hydroxyquinoline of the formula

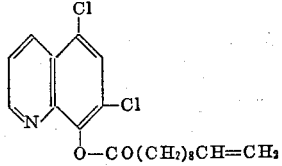

passes over at 202–208° under 0.15 mm. pressure, and is an oil which gradually solidifies. The yield amounts to 69 per cent. of the theoretical yield.

*Example 4*

20 parts of 5-chloro-7-iodo-8-hydroxyquinoline are dissolved in 80 parts by volume of pyridine and mixed with 13.5 parts of undecylenic acid chloride dissolved in 100 parts by volume of ether. After allowing the whole to stand for a long time, the reaction mixture is washed as in the preceding examples and dried. The ether is distilled, the oily residue, which contains the undecylenic acid ester of 5-chloro-7-iodo-8-hydroxyquinoline, is again dissolved in ether, and the solution is filtered and mixed with the calculated quantity of methane sulfonic acid. The oil which separates solidifies in the cold. The thus obtained methan sulfonate of the undecylenic acid ester of 5-chloro-7-iodo-8-hydroxyquinoline, of the formula

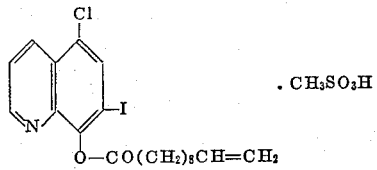

melts at 61–63°. The yield amounts to 50 per cent. of the theoretical yield.

*Example 5*

A solution of 20 parts of 8-hydroxyquinaldine in 150 parts by volume of ether and 10 parts by volume of pyridine is mixed with a solution of 22.5 parts of undecylenic acid chloride in 50 parts by volume of ether, and the whole is allowed to stand for several hours. The reaction mixture is washed and dried, as in the preceding examples. After removing the ether, the undecylenic acid ester of 8-hydroxyquinaldine of the formula

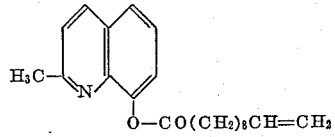

distils at 194–196° under 0.2 mm. pressure in a yield amounting to 78 per cent. of the theoretical yield.

*Example 6*

By replacing the 8-hydroxyquinaldine, used by Example 5, by a corresponding quantity of 5,7-dichloro-8-hydroxyquinaldine, and otherwise proceeding as set forth in the said example, the corresponding undecylenic acid ester of 5,7-dichloro-8-hydroxyquinaldine of the formula

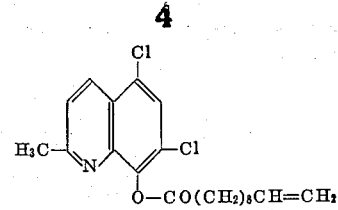

is obtained.

What is claimed is:

1. A member selected from the group consisting of the undecylenic acid esters of 8-hydroxyquinolines, of the formula

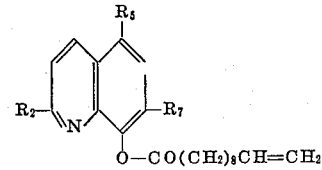

and the acid addition salts thereof, $R_2$ being a member selected from the group consisting of hydrogen and methyl, and each of $R_5$ and $R_7$ being a member selected from the group consisting of hydrogen, chlorine and iodine.

2. The undecylenic acid ester of 8-hydroxyquinoline of the formula

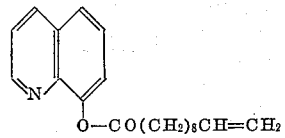

3. The undecylenic acid ester of 5-chloro-7-iodo-8-hydroxyquinoline of the formula

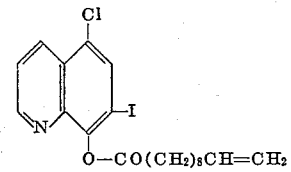

4. The undecylenic acid ester of 5-chloro-8-hydroxyquinoline of the formula

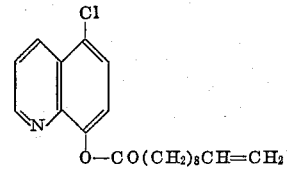

5. The hydrochloride of the undecylenic acid ester of 8-hydroxyquinoline, of the formula

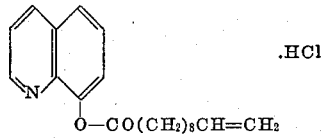

6. The methane sulfonate of the undecylenic acid ester of 5-chloro-7-iodo-8-hydroxy-quinoline, of the formula

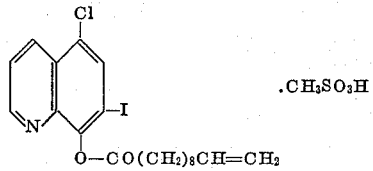

ROBERT NEHER.

No references cited.